United States Patent

Bond et al.

[11] Patent Number: 5,982,769
[45] Date of Patent: Nov. 9, 1999

[54] SWITCH RECONFIGURATION

[75] Inventors: Stuart Bond, Girton; Jonathon Coward, Radwinter; Phillip William Hobson, Bishops Stortford; Kevin John Twitchen, Harpenden, all of United Kingdom

[73] Assignee: Northern Telecom Limited, Montreal, Canada

[21] Appl. No.: 08/894,582

[22] PCT Filed: Mar. 27, 1996

[86] PCT No.: PCT/GB96/00726

§ 371 Date: Aug. 21, 1997

§ 102(e) Date: Aug. 21, 1997

[87] PCT Pub. No.: WO96/31071

PCT Pub. Date: Oct. 3, 1996

[30]  Foreign Application Priority Data

Mar. 27, 1995 [GB] United Kingdom ................... 9506199

[51] Int. Cl.⁶ .............................. H04L 12/50; G06F 9/30; H04M 3/00
[52] U.S. Cl. .......................... 370/357; 370/360; 379/242; 395/375
[58] Field of Search ..................... 395/653, 651, 395/82, 85, 183.09, 200.5, 200.3, 200.58; 379/201, 10

[56]  References Cited

U.S. PATENT DOCUMENTS

5,384,823  1/1995  Brenski et al. ........................... 379/10
5,533,109  7/1996  Baker ...................................... 379/201

*Primary Examiner*—Hassan Kizou
*Assistant Examiner*—John Pezzlo
*Attorney, Agent, or Firm*—Lee, Mann, Smith, McWilliams, Sweeney & Ohlson

[57]  ABSTRACT

The operationality of instructions arranged to control a telecommunications switch is tested by referring to originating instructions. A module of instructions forming part of encoded sets of originating instructions is identified, and the module is processed to obtain definitions of its interactivity with other modules of the instruction set and the interactivity with signal transmissions external to the module. This facilitates the generation of upgraded or replacement originating instructions from which new executable instructions are obtainable after being embedded within the telecommunications switch.

12 Claims, 11 Drawing Sheets

SWITCH RECONFIGURATION

The present invention relates to a method and apparatus for analysing a selected module from a plurality of modules of originating instructions, to generate upgraded originating instructions, the originating instructions being for conversion into control instructions to control operations of a telecommunications switching means.

BACKGROUND OF THE INVENTION

In recent years it has been appreciated that the modification of control instructions in major systems is by no means a straightforward matter and over the years improved techniques have been developed for constructing large collections of instructions for operation in real time, in environments where errors could result in major systems failure.

A significant amount of time and money was often spent in the development of control instructions and, although it is often desirable to make upgrades, it is also desirable to obtain maximum benefit from existing code. Although the size of existing instruction is large and is often not consistent with modern development techniques, it does in itself provide two distinctive advantages. Firstly, it exists, and does not require additional investment in order for it to be created. Secondly, given the fact that generally, it will have been in operation for several years, it is tried and tested.

To an operational manager deriving benefits from existing systems, the associated instructions are perceived as something of great value, and is often referred to as "heritage" code. However, to the development engineer, the existing code provides major problems, in that it, generally, is not consistent with modern techniques and modern procedures. In particular, it has been found in recent years that object-oriented environments are particularly suited to defining telecommunications functionality, given their inherent modularity. Development Engineers tend not, therefore, to see existing earlier instruction suites in such glowing light and tend to refer to them as a "legacy" to be tolerated, rather than an inheritance to be appreciated!

When presented with a legacy system of this type it is not uncommon to be referring to several million lines of executable statements and maintenance engineers may adopt one of two clear strategies.

Firstly, they could continue to operate in the manner anticipated by their predecessors. Thus, they would continue to use the earlier techniques and develop systems in accordance with the tried and trusted methods. The second option would be to effectively discard all of the previous legacy instructions and start again, defining each of the modules in accordance with modern object-oriented techniques. However, although appearing to be attractive, such a strategy would in itself present several risks. Firstly, it is possible that the investment required would be too large, thereby creating an intolerable burden in terms of the development costs. Secondly, it is likely that the systems must interface with other systems, therefore it would not be entirely possible to disregard all of the legacy systems because they may belong to another party. Thirdly, a major re-write of all of the instructions would take a significant period of time. It is therefore possible that procedures adopted at the beginning of a development process, although modern in their time, would rapidly become out of date.

IEEE International Conference on Communications, vol. 1, 23 May 1993, Geneva CH; pages 326–330 (Geyer et al) shows a design method for object oriented switching system software including identification of objects and relations between objects.

IEEE Global Telecommunications Conference, vol. 2, December 1991, Phoenix US; pages 1371–1377 (F. S. Dworak) discusses the problems caused when new service features are added to telecommunications networks. Features of services interact, and conflict detection becomes difficult, particularly with multiparty, multimedia call control. Interactions are extracted from state machines, and expressed separately, externally. Automated conflict detection uses predefined generic conflicts which may arise in the interactions.

GB-A-2264575 discusses upgrading software in a telecommunications network. A timestamp is sent with each call, indicating a start time. Any upgraded software is sent to each site in the network with an activation time indication. This enables calls to be processed using a consistent upgrade version of the software.

WO-A-9429993 discusses another method of avoiding interference between services. Services are defined in terms of action elements which may give rise to interference, ie feature interaction. Interference event trees are formed, and used to determine whether a new service can be executed, based on what services are currently being executed for the same call.

None of these documents are concerned with the problems of how to upgrade legacy code efficiently.

SUMMARY OF THE INVENTION

In a preferred embodiment, statements within a selected module are grouped together to define a plurality of procedures and interface statements are processed sequentially for each of said procedures.

Preferably, the processing means examines paths through the statements, and retains paths which include statements labelled by the labelling means.

BRIEF DESCRIPTION OF THE DRAWINGS

The invention will now be described by way of example only with reference to the accompanying drawings, in which:

FIG. 12 details the definition of interface constraint step identified in FIG. 7.

DESCRIPTION OF PREFERRED EMBODIMENT

Figure 1:
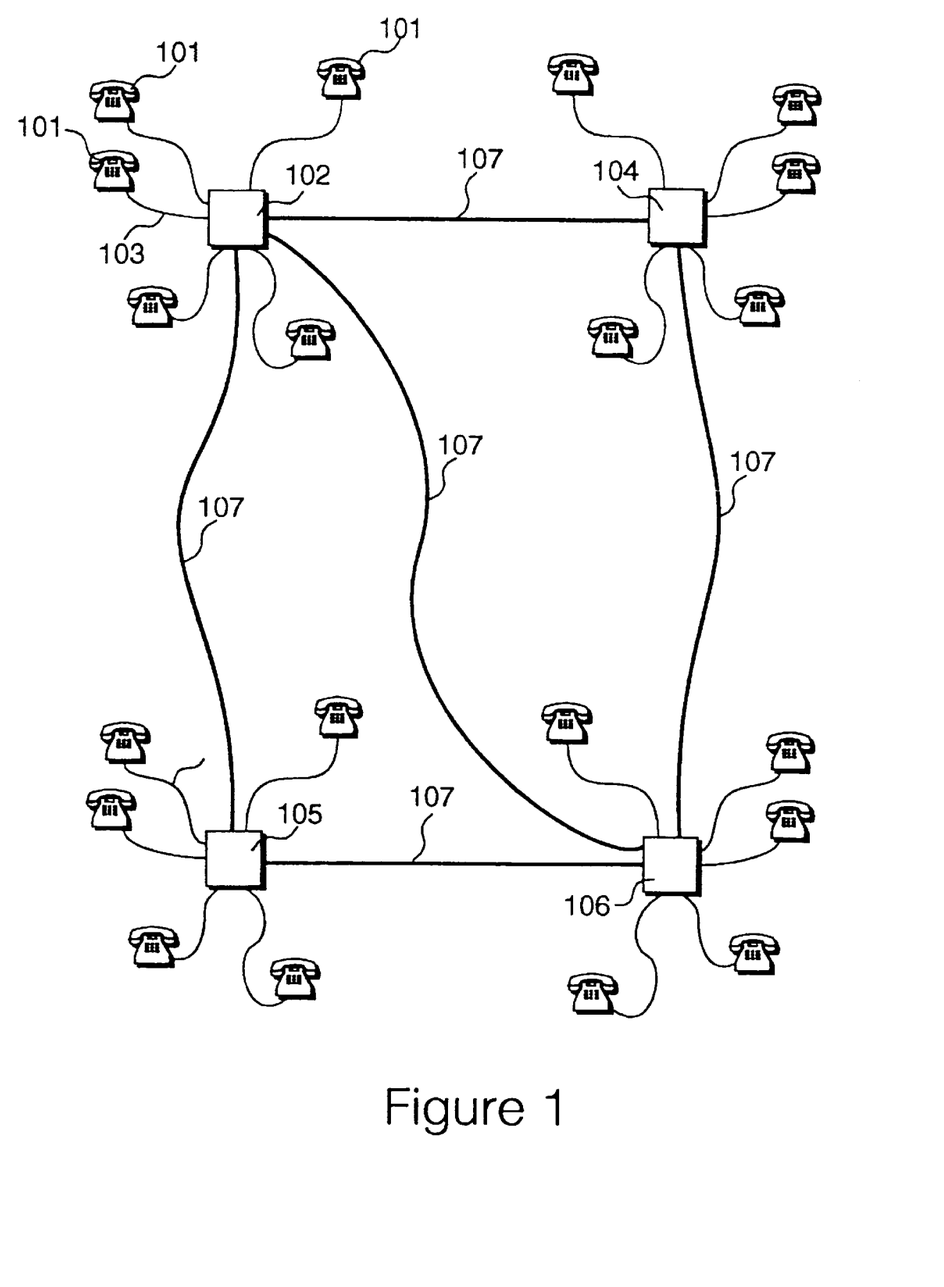
FIG. 1 shows a classical telecommunications environment having a plurality of analogue telephones connected to a local exchange.

A classical telecommunications environment is shown in FIG. 1, in which a plurality of analogue telephones 101 are connected to a local exchange 102 via respective communication links 103 in the form of a twisted pair of copper conductors. The local exchange 102 is also connected to other similar local exchanges 104, 105 and 106 and in a real network, the number of local exchanges connected to the network would be very large indeed, covering large geographical areas.

The local exchanges are connected via trunk cables 107 and traditionally these trunk cables were also provided in the form of copper conducting cables. Consequently, the cost of providing all this cabling was quite significant and represented a substantial proportion of the overall cost of the network. The total cost of the switching apparatus was relatively low, therefore more could be invested on this apparatus an attempt to maximise the efficiency of the available cable. This led to the use of frequency division multiplexing, so as to increase the number of communication channels which could be conveyed along a common physical link.

The ability to increase the number of transmission paths provided by a single physical link was enhanced in the 1970s by the utilisation of digital transmission techniques, which allowed many pulse code modulated signals to be combined by a process of byte multiplexing. Thus, a four kilohertz analogue telephone signal could be represented as a sixty four kilobit per second digital bit stream, whereafter thirty of such channels could be combined, together with signalling information, to provide a 2.048 megabit per second multiplex.

In order to facilitate digital transmission of this type, characteristics of the exchanges, such as exchanges 102, 104, 105 and 106 in FIG. 1, became increasingly complex and significant circuit design was required in order to provide platforms which in turn could make available the required level of functionality. Thus, no longer were local exchanges; merely required to provide switching mechanisms for analogue signals, they were required to provide analogue-to-digital conversion, time switching, in addition to space switching, and multiplexing, where appropriate, for transmission over multiplexed trunk cables.

It was soon realised that the level of multiplexing could be increased and standards were established for transmitting at one hundred and forty megabits per second and five hundred and sixty five megabits per second, effectively giving a deep hierarchy of available bit rates.

The transmission of digital data over substantial bandwidth provision, enabled other communications services to be incorporated within a network which was originally provided solely for the transmission of relatively low bandwidth speech signals. As soon as it became apparent that a premium charge could be placed on data transmission of this type, the race was on for establishing connection points within existing networks for commercial purposes. Thus, in addition to speech telephones being connected through switched telephone networks, it became possible to connect data processing equipments separated by large geographical distances and thereby significantly improve the overall flow of data between displaced sites.

This process was further enhanced by the introduction of synchronous transmission systems which in turn facilitated data ports to be provided at many different data rates, without disrupting the overall integrity of the multiplexing and transmissions systems. This in turn led to a vast expansion in the number of services which could be provided within the network and the level of intelligence which could be embedded within the network. A retention of hard-wired switching sub-systems would have effectively led to a stagnation of this expansion process and it therefore became inevitable that switching systems of this type would be replaced with adaptable programmable systems, in which general purpose hardware switching matrices would be configured in response to executable instructions . Thus, as far as the switching sub-system is concerned, local executable instructions may be considered as the means, by which switching functionality, in terms of actual-hardware components, is configured, so as to provide a level of system functionality within the network environment.

Figure 2:
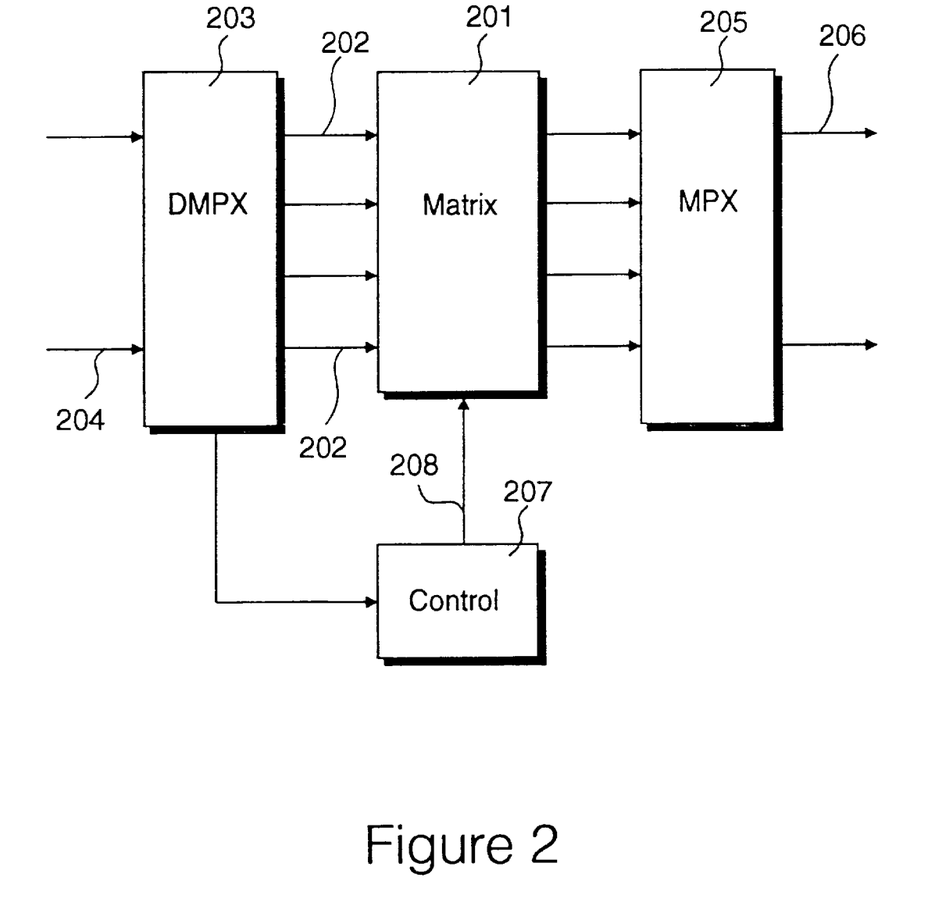
FIG. 2 shows a digital switching sub-system.

A typical switching sub-system operating under these conditions is illustrated in FIG. 2. A switching matrix 201 receives input channels 202 from a de-multiplexing device 203. The de-multiplexing device 203 in turn receives trunk cables 204, each arranged to convey a plurality of multi-multiplexed signals.

Each line 202 supplied to the matrix 201 includes a thirty channel time multiplex and within the matrix 201 time switching occurs, in which the positions of time slots are re-arranged and space switching occurs in which data conveyed within a particular multiplex is switched to another multiplex. Thereafter, the switched time multiplexes are supplied to a re-multiplexing circuit 205, which in turn provides outputs on trunk cables 206, conveying higher order digital multiplex signals.

The matrix 201 itself contains all the physical elements required to perform switching operations. The actual switching operations themselves are effected under the control of the central controlling device 207, that is itself arranged to execute control instructions and supply control signals to the matrix 201 over control lines 208.

Figure 3:
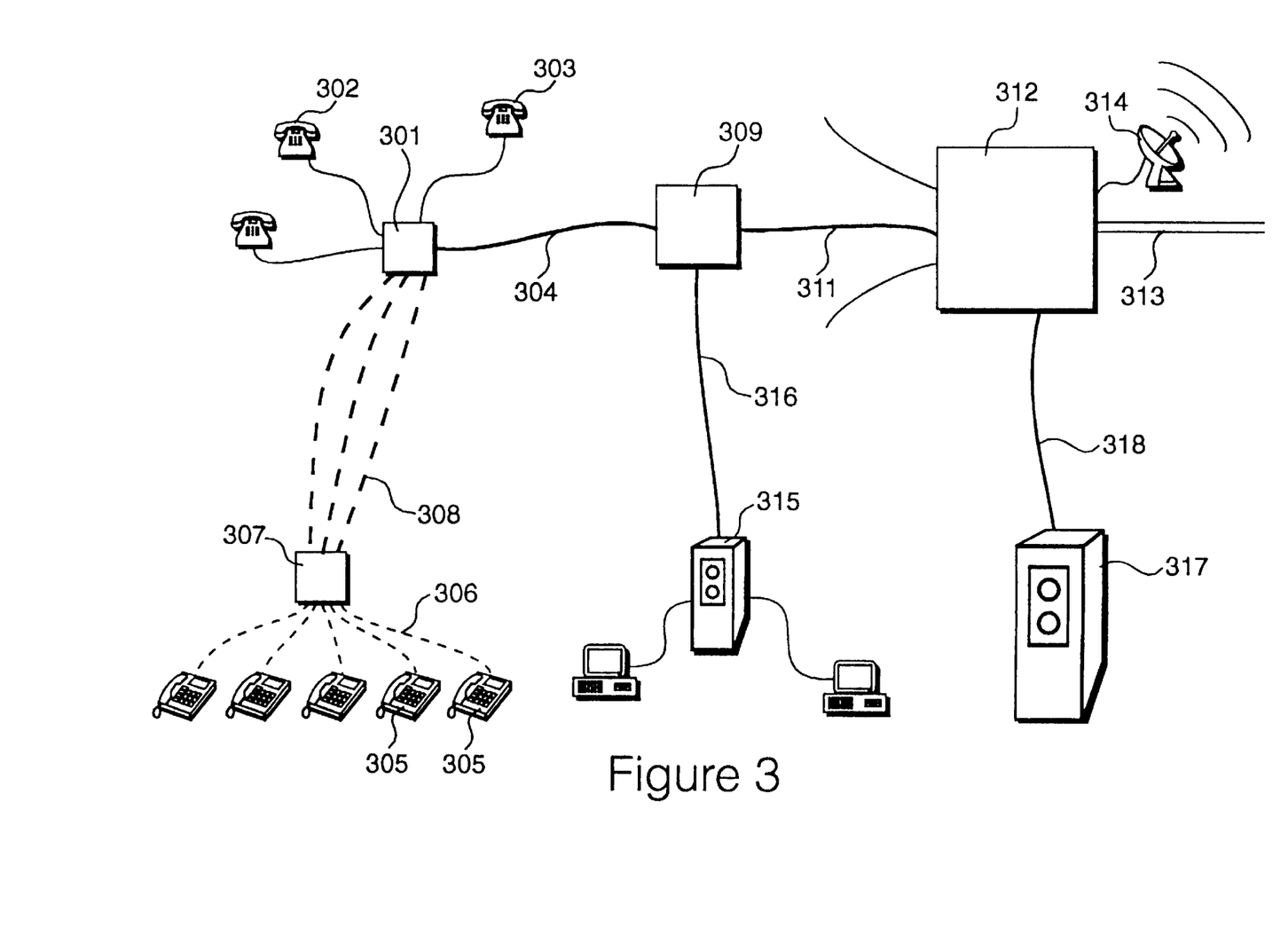
FIG. 3 shows part of a complex digital telecommunications network.

Digital switching sub-systems of the type shown in FIG. 1 allow telecommunications networks to be built up, as illustrated in FIG. 3. Thus, in FIG. 3 a local exchange 301 is similar to local exchange 102 shown in FIG. 1. Similarly telephones 302 and 303 may be identical to telephones 101 shown in FIG. 1 and communicate with the local exchange 301 over analogue twisted pairs. However, at the local exchange the analogue signals are converted into digital signals, thereby facilitating transmission over trunk cables, such as trunk cable 304, in the form of a time division multiplex.

Given that local exchange 301 operates within a digital environment, it is also configured to communicate with digital telephones 305. These digital telephones are connected, via digital communication channels 306, to a line concentrator 307. Thus, in the example shown in FIG. 3, five digital telephones 305 are connected to the concentrator 304, but only a total of three digital lines 308 are provided in order to connect the concentrator 307 to the local exchange 301. At the local exchange 301 analogue signals received from telephones 302 and 303 are converted into digital signals and combined with digital signals; originating from concentrator 307 such that, from the rest of the networks; standpoint, the signals are effectively equivalent.

The trunk cable 304 in the example shown in FIG. 3 is arranged to convey a thirty channel multiplex. However, this cable is supplied to an intermediate exchange 309, arranged to receive similar multiplexes, such as on line 310 and thereafter combine these multiplexes into a higher order of multiplexing for transmission over a trunk cable 311. Similarly, a further level of concentration may be provided at an intermediate switching station 312 which in turn provides an even higher level of multiplexing for transmission over trunk cable 313. Furthermore, signals multiplexed to this level of concentration may also be supplied to microwave links, illustrated by microwave dish 314.

The multiplexing performed by the configuration shown in FIG. 3 is synchronous, such that it is possible for a two megabit link to be provided to a data processing facility 315 over a direct data digital communication 316. Thus, at the intermediate exchange 309, the digital multiplex received from processing station 315 may be considered in a substantially similar way to the speech multiplexes received on communication trunks 304 and 310.

Similarly, intermediate exchange 312 may provide an even higher digital bandwidth, say sixty four megabits per second, to a high powered data processing system 317 over a direct digital link 318. Again, at digital exchange 312, data received over the communication path 318 is considered in substantially the same way as the multiplex received from exchange 309 over trunk 311.

The ability to reconfigure the functionality of individual operating sub-systems, in response to executable instructions, facilitates the construction of complex communication environments as shown in FIG. 3. In addition, it will readily be appreciated that a first level or layer of instructions may be provided in order to control the operations of individual components, with higher layers of functionality being provided in order to co-ordinate the operation of individual sub-systems within the overall network. Thus, the development of systems of this type has led to a hierarchical and modular approach.

In conventional communication networks, hierarchies were effectively geographical and the provision of resources were dictated by the allocation of bandwidth. However, due to increasing levels of multiplexing and the introduction of relatively inexpensive optical fibre links, the cost of transmitting signals over large distances has reduced dramatically, therefore the hierarchy of distributed switching systems may be considered in terms of their functionality, rather than their geographical displacement.

Figure 4:
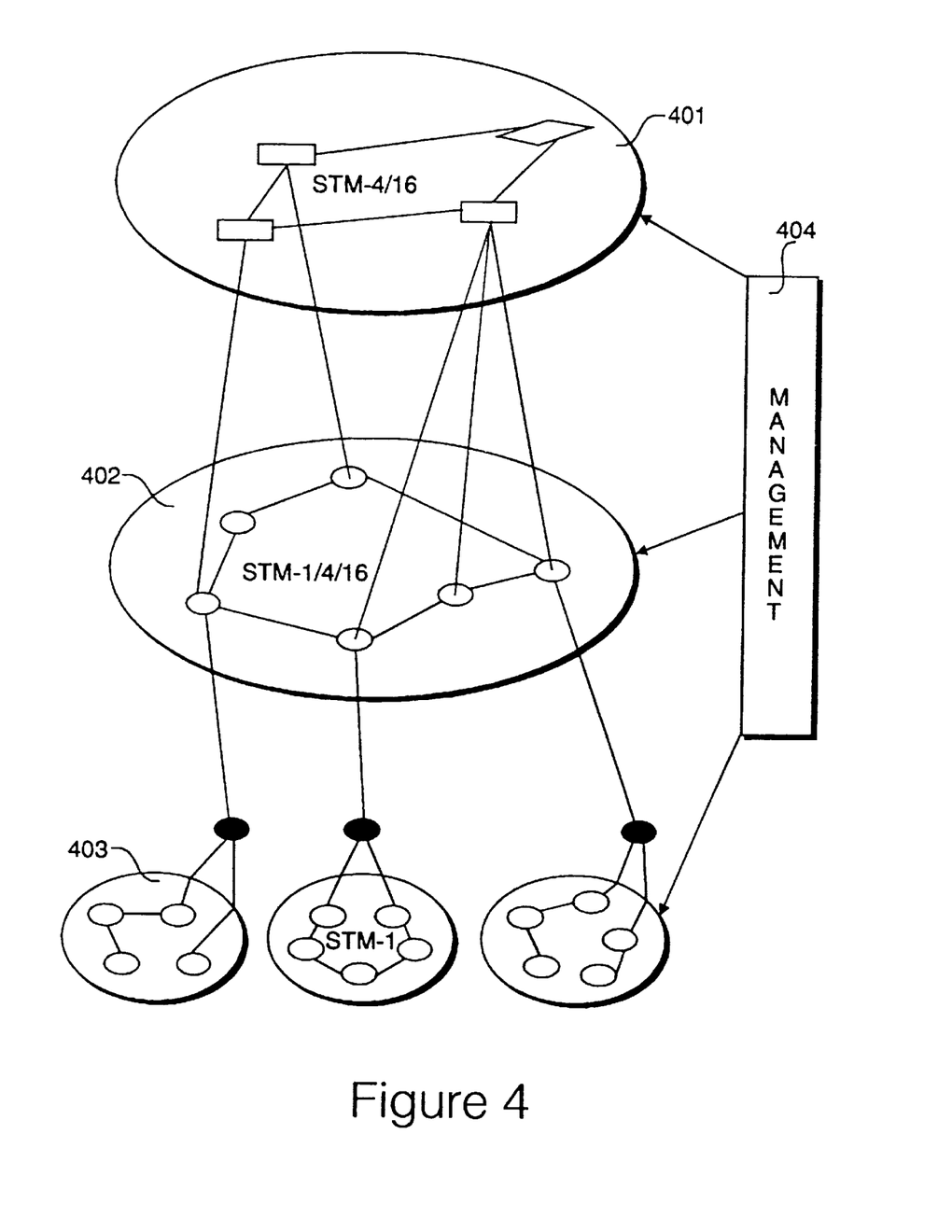
FIG. 4 shows a hierarchical representation of a network of the type identified in FIG. 3.

An illustration of this hierarchical approach is shown in FIG. 4. Thus, a first tier of communication represents the highest level of bandwidth communication, provided between central switching sites, which may in turn be distributed globally. Below this a second tier 402 unifies switching operations being performed at a lower concentration of multiplexing, with a similar reduced level of multiplexed communication occurring at a third tier of operation 403.

Each unit within the tier will have its own set of control instructions, with control instructions coordinating operations within a tier and an overall operational control being effected at a management control level 404.

In addition, greater levels of functionality have been provided to individual telephone subscribers, providing services such as call forward and automatic redial etc. These services may be added to existing networks by upgrading and modifying instructions executable on switching sub-systems. An advantage of such an approach is that it is possible to add additional functionality while minimising the amount of time during which the sub-system itself is placed off-line. This is because new instructions may be developed on independent development platforms, tested and only then converted into an executable form, suitable for downloading onto the switching system itself.

In many situations a modular approach has been adopted in terms of creating modules of instructions, ultimately executable on switching sub-systems. Originating instructions usually consist of identifiable lines and in many situations the number of lines present in the originating instructions may run into many thousands, possibly millions. These lines of instructions however do form part of identifiable modules and in many circumstances it is possible to upgrade modules without needing to reconstruct the whole set of executable instructions. However, this exercise is not as straightforward as it may appear, given that, over the years, modifications will have been made and a complete analysis of the existing instructions may be difficult to locate and comprehend.

Figure 5:
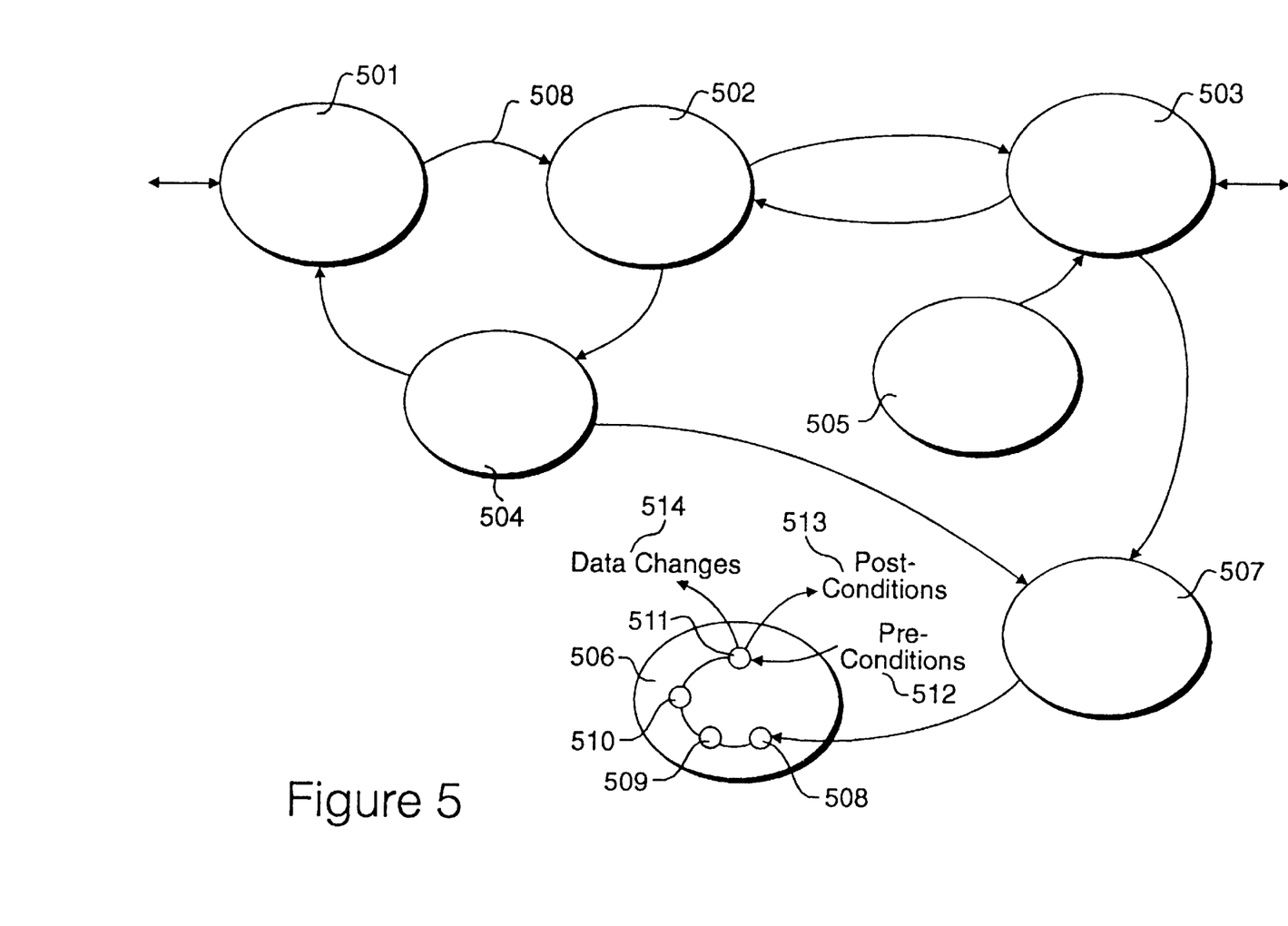
FIG. 5 shows an example of relationships between modules of instructions for controlling operation of switching systems of the type shown in FIG. 3.

A graphical representation of a set of originating instructions is illustrated in FIG. 5. The instructions are identified as residing within respective modules. Thus, a set of instructions, possibly in the form of several files each containing several thousand lines of instructions, are present within a module 501, with a similar set within module 502, a similar set within module 503 and so on for modules 504, 505, 506 and 507. FIG. 5 is merely illustrative and in a real working set of instructions the number of modules present may be significantly larger.

The arrows connecting the modules shown in FIG. 5 represent their inter-dependency. Thus, when instructions resident within module 501 are being executed, these instructions may in turn make a call to instructions within module 502, illustrated by arrow 508. Similarly, module 502 may call 503, which in turn may also call back to 502 in a recursive manner or call module 507. Thus, a complex network of inter-relations have been built up, in which new modules are added, usually to provide enhanced functionality, while at the same time, making calls to existing modules so as to make use of instruction sets already present within the overall system and, ideally, to reduce the total size of the instructions required in order to operate the switching system.

Within each module a degree of functionality is provided. Thus, to provide an illustration, it is assumed that the instructions defined within module 507 have become obsolete and it would be desirable, in order for the switch as a whole to provide the new required level of functionality, to replace the instructions contained within module 507 with new instructions, possibly created using new techniques and implementing new automated procedural tools etc.

On the whole, it should be a quite straightforward matter to generate new instructions for execution within module 507, so as to provide the required level of functionality. However, it should be appreciated from the inter-dependency of modules illustrated in FIG. 5, that it is not possible to construct instructions for module 507 in complete isolation. Careful consideration must be taken of the interactivity of the instructions contained within module 507 with its co-operating modules. Thus, a specification must be drawn up which details the required level of functionality required by new module 507. However, in addition, the specification must also include a detailed description of how module 507 communicates or interfaces with the rest of the overall instruction environment. Thus, in a particular example, it can be seen that module 507 is itself invoked in response to a call originating from module 503 or module 504. Thus, instructions contained within module 507 must be responsible to these particular types of invocations, which will be set in accordance with instructions resident within modules 503 and 504. Modules 503 and 504 will invoke module 507 in a particular way, therefore this definition must include an interface specification. Similarly, module 507 is itself required to invoke the assistance of module 506 and again the particular nature of this invocation will be specified, such that the interface between modules 507 and 506 is maintained and module 506 is unaware that module 507 has been replaced.

Ultimately, control signals and other types of signals must be generated by the overall set of instructions and, similarly, the instructions will be arranged to receive signals emanating from their local exchange hardware and, probably, emanating from other units within the overall structure. Thus, as shown in FIG. 5, modules 501, 503 and 506 are arranged to perform communications with external devices and the nature of these communications must also be specified for the respective module interfaces. Thus, before work can start in preparing new instructions for a particular module, it is necessary to accurately define its interface with other modules within the set of instructions. In order to do this, the instructions themselves are processed, thereby generating an indication as to the nature of the interface and facilitating the creation of new instructions which, although providing a new level of functionality within the overall network, will interface with existing modules in substantially the same way as the previous module that has been replaced.

Figure 6:
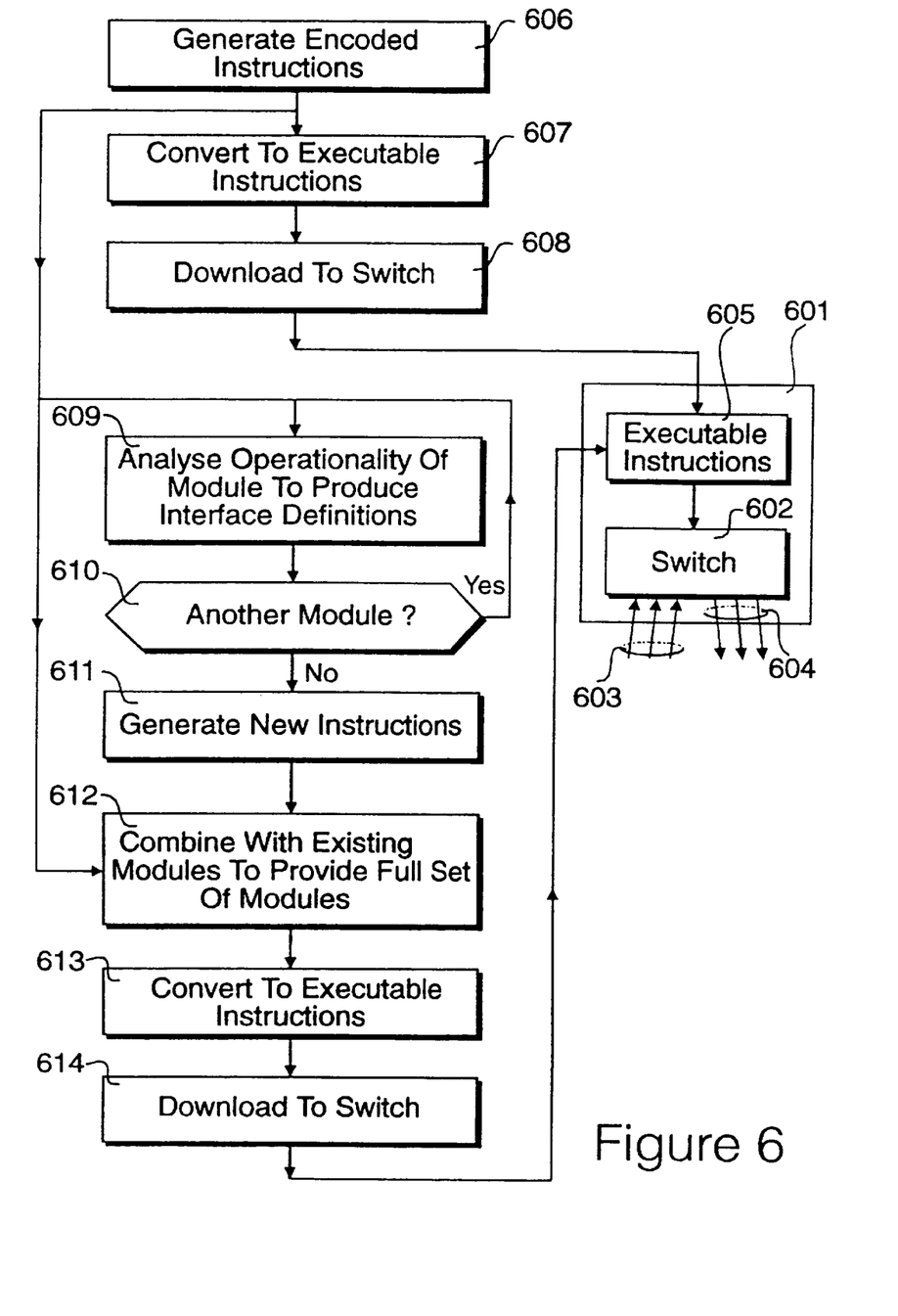
FIG. 6 illustrates a machine executable routine for processing modules of the type shown in FIG. 5 for execution on a switch of the type shown in FIG. 3, including a step which analyses the operationality of a module to produce interface definitions.

Each module is constructed from a plurality of interrelated procedures, each identified by its own procedure or file name. The procedures contain a list of statements which, once converted and downloaded onto the switch 602 are executable on a line-by-line basis.

Internal procedures are shown within module 506. A call from module 507 is directed towards procedure 501, resulting in an invocation of said procedure. Procedure 501 may therefore be identified as a "public" procedure, given that it experiences a degree of communication which crosses the module boundary. Procedure 501 may in turn call procedure 509 which in turn may call procedure 510. Procedures 509 and 510 do not communicate across the module boundary and are therefore identified as "private" procedures. Procedure 511 is callable by procedure 510 and this procedure also communicates across the module boundary, therefore defining it as a "public" procedure. Thus, in order for procedure 511 to interface correctly, pre-conditions 512, post-conditions 513 and data changes 514 must be specified.

A procedure for processing modules in order to define interface constraints is shown in FIG. 6. A switching system 601 includes a switch 602, arranged to receive incoming data on line 603 and to transmit outgoing data on line 604. The operation and configuration of switching mechanisms within switch 602 is accurately controlled in response to the execution of executable instructions, received from a storage device 605.

Prior to the actual installation and commissioning of switching system 601, encoded instructions were generated at a step 606 These instructions would have been converted at step 607 into an executable form and at step 608 the instructions were downloaded to the instruction storage memory device 605.

The instructions generated at step 606 were of the modular type illustrated in FIG. 5 and it will be assumed that a large number of upgrades and modifications have been made, thereby creating a problem in terms of generating and upgrading individual modules within the suite.

In order to facilitate this upgrading and in order to specify the interface constraints for individual modules, the original encoded instructions, representing the operationality of the executable instructions supplied to the switch itself, are analyzed at step 609. Thus, at step 609 the modules of instructions are processed to obtain definitions of interactivity with other modules within the set of modules and to obtain definitions of interactivity with signal transmissions external to the module. Thus, in this way, the generation of replacement originating instructions, from which new executable instructions are generatable, is significantly facilitated, thereby providing enhanced functionality to the switching system 601 when the new executable instructions have been embedded within the switching system.

At step 610 a question is asked as to whether another module is to be analyzed and if answered in the affirmative, control is returned to step 609.

If a question asked at step 610 is answered in the negative, new instructions are generated at step 611 in response to the interface analysis made at step 609. At step 612 the new instructions are combined with the existing modules, that is all the modules except for the module for which new instructions have been produced, so as to generate a full set of instructions in encoded form.

At step 613 these encoded instructions are converted to executable form, a process similar to that performed at step 607 and at step 614 the executable instructions are downloaded onto the switching system 601.

Figure 7:
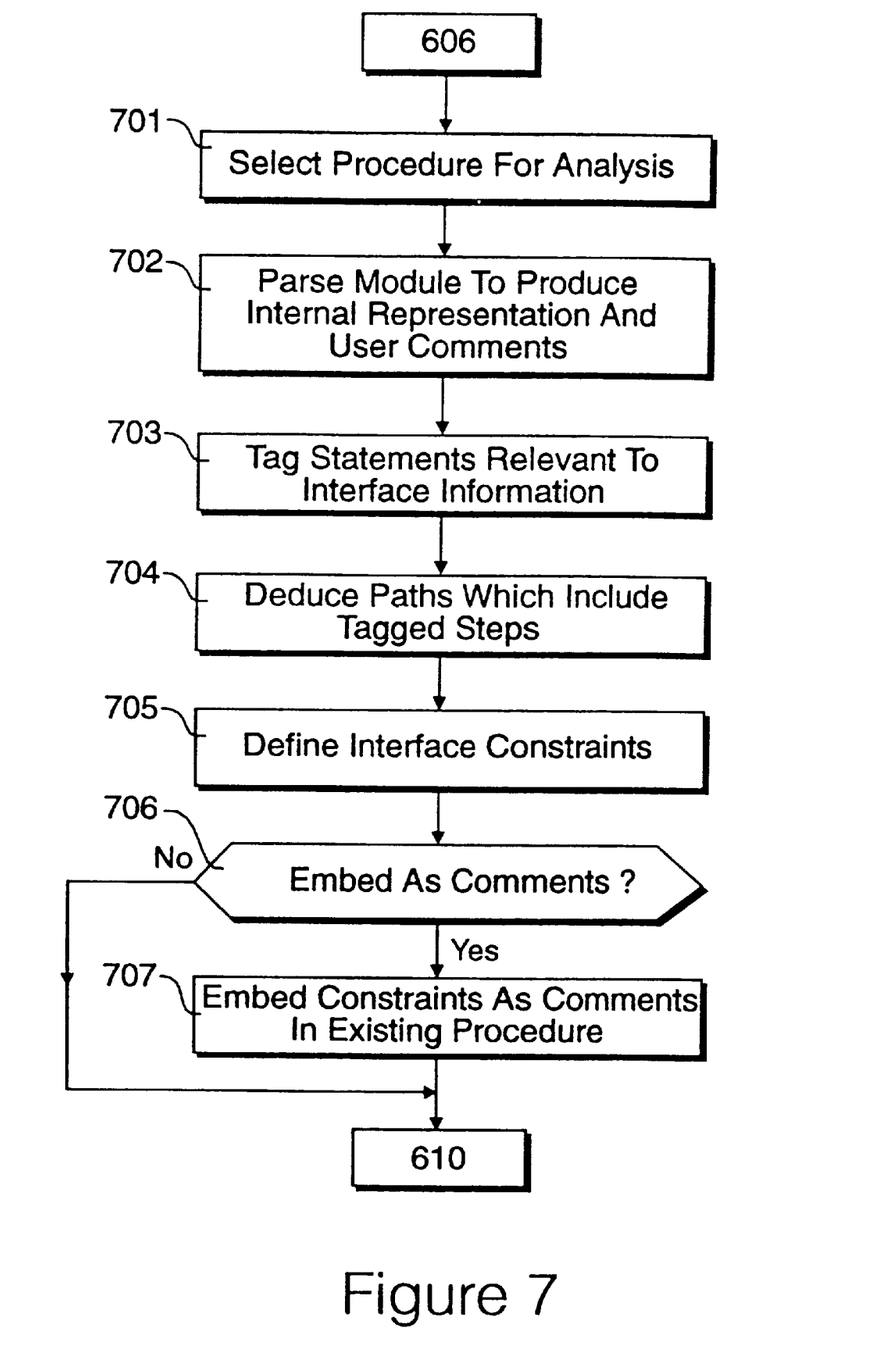
FIG. 7 details the analysis step identified in FIG. 6, including a step for the tagging of relevant procedures and a step for deducing paths which include tagged steps.

The analysis step 609 is detailed in FIG. 7. At step 701 a module is selected for analysis which, thereafter, is parsed to produce an internal representation of the instructions to be executed, along with details of user comments included in the originating encoded instructions.

Thus, the parsing step 702 builds up an internal data representation of the source originating encoded instructions and extracts user comments therefrom, which may be later reproduced in the interface specification. The parsing process is similar to initial procedures used to convert encoded instructions into executable instructions, as identified at step 607 in FIG. 6. This machine readable form of the encoded instructions allows subsequent processing to analyze these instructions and thereafter produce a detailed account of the behaviour of the procedures executed by instructions contained within the module. The behaviour of the procedure represents the tasks that can be expected to be performed by that particular module and this will be determined by the transitions of inputs to outputs and changes made to global variables and structures after an invocation of the routines contained within the module. Thus, step 702 to 704 represent procedures by which the encoded instructions may be retained within memory locations of an analysing platform, thereby allowing it to make a technical assessment of its interface definitions.

At step 703 (detailed in FIG. 10) the procedures parsed at step 702 are considered to identify particular individual steps which are relevant to interface information. Thus, at step 703 it is possible to identify actual procedures which may be perceived from an interface to the procedure and will therefore undergo modification, possibly, when the procedure is invoked. Thus, it is these particular relationships which will need to be considered in terms of an interface definition, on the assumption that the interfaces are actually invoked when the routine under consideration is called for execution.

At step 704 (detailed in FIG. 11) executions of the parsed code are simulated, and particular consideration is given to the tagged steps identified at step 703. Thus, from an interface standpoint, only paths which include tagged steps are required to be deduced, in order that a full specification of the interface may be defined.

Thereafter, having significantly reduced the number of possible paths, to those procedures tagged at step 703, the definition of the interface constraints are defined.

At step 706 a question is asked as to whether comments, defining the interface constraints of the procedures deduced by the previous steps, are to be embedded within the encoded procedures of the module. If answered in the affirmative, the constraints are embedded in the existing module instructions, resulting in the source instructions being updated so as to include the constraints comments. After step 707 or as a result of 706 being answered in the negative, control is directed to step 610 which, as shown in FIG. 6, asks as to whether another module is to be considered. If answered in the affirmative, control is returned to step 701 and another module is selected.

As previously stated, the parsing step at step 702 is substantially similar to procedures performed at steps 607 and 613, in order to convert the encoded instructions into an executable form for execution on the switching system 601. After step 702, the processing of the parsed encoded statements takes on a different form, in order to specify the interface constraints. The passing of relevant statements, at step 702, is detailed in FIG. 8.

Figure 8:
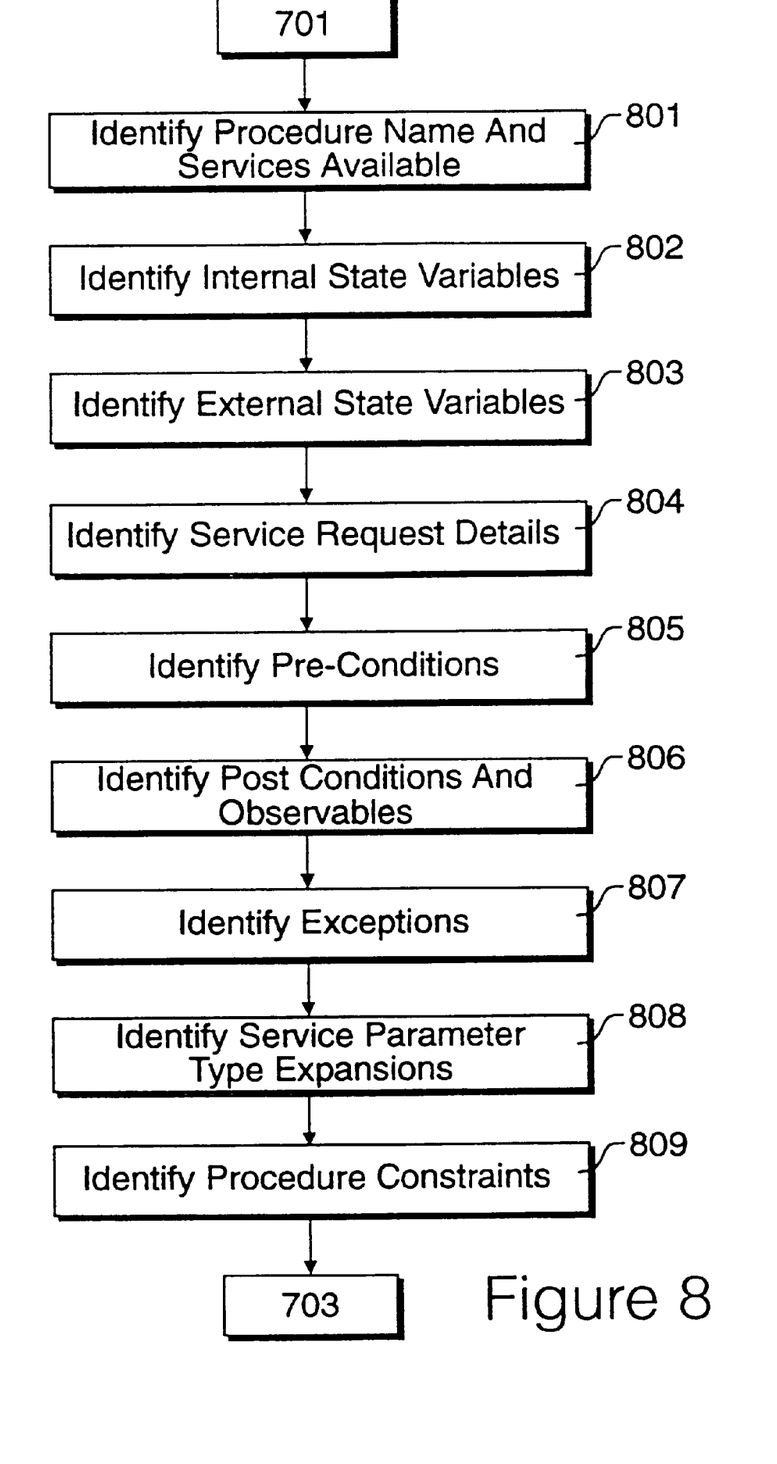
FIG. 8 details the parsing step shown in FIG. 7.

At step 801 the name of the a procedure under review is identified and recorded. In addition, step 801 also searches for the names of all procedures within the module which are accessible from outside the module. As used herein, such procedures will be referred to as being publicly accessible while procedures which are purely accessible from within the module itself and are not accessed from outside the module, will be referred to as private procedures. Procedure names are tagged so that they can be identified subsequently, whereafter they may be considered as services, given that each procedure which may be invoked externally represents a particular service within the module which needs to be expressed in the module interface.

At step 802 the names of internal state variables are identified. These are the variables that are shared by the service within the module but are entirely private to the module. Interactions with these variables can only take place through the services of the module itself. It is only necessary to identify the internal state variables that are used to determine a particular outcome of a service request, referred to herein as a post-condition or those which form the basis for a post-condition by virtue of the given service causing them to be updated.

It is not necessary to model changes to variables that do not directly affect the outcome of this or of other services within the module. These internal variables are ignored.

Thus, internal variables which are relevant to the interface operation of the module are tagged. Step 802 then goes on to identify the particular type of the tagged variables, given that it is necessary to have at least a high level type expansion for each of the internal state variables so tagged.

At step 803 the names of the external state variables are identified by tracking the instance of the variable to its declaration. If it is declared in the module's private interface, it represents an internal state variable. However, if it is declared in the module's public interface or in another module, it represents an external state variable. If the instance of the variable is a pointer, it is necessary to determine whether the construction of the pointer is at an internal or an external state variable.

The external state variables are those which are shared by services within the module and, in addition, are also accessible to other modules and services. The particular external variables that are tagged consist of those which are used to determine the particular outcome of a service request, that is to say, a post-condition, and those which form the basis of a post-condition by virtue of the given service updating them.

External state variables are accessed by other services and modules and therefore it is important to capture changes that may be made to them by the particular service under analysis. Again, the particular types of the variable is also identified.

At step 804 an identification is made of the service request details. Each service includes a service request rule, in the form of the service name followed by the list of parameter types associated to the request. The parameters and parameter types are recorded and classified in accordance as to whether they are read by the service or updated by the service.

At step 805 an identification is made of pre-conditions. Pre-conditions represent constraints imposed upon the requests made to the particular service under consideration, that must be satisfied before the request service can be expected to perform in a predictable way.

The pre-conditions may be summarised as service request pre-conditions, pre-conditions on success and weak pre-conditions.

Service request pre-conditions are those expressed before a service can be requested. For example, it may be that a service can only be requested provided that another service has been successfully requested previously. Another example is a situation in which two state variables must be equal before the service can be requested.

Pre-conditions on success are all the pre-conditions that must be satisfied in order to guarantee the success of the requested service. The service implementation will often include checks to deal with the violation of pre-conditions. This violation will generally produce an error therefore at step 805 an examination is made as to how and where these errors are generated, which in turn indicates the conditions that need to be satisfied in order for the service to perform successfully.

Weak pre-conditions are conditions defining types of variables, therefore a weak precondition of the service is one stating that variables must be of the correct type.

At step 806 post-conditions are identified, representing the results of a service request. Post-conditions of the given service will indicate the changes made to step variables, service request parameters and return values. The service may terminate in a plurality of possible states, depending on its behavioural characteristics. However, once the service parameters and state variables effected by the service have been identified, it is possible to determine the changes made to them and hence to identify the post-conditions of the service.

At step 807 an identification is made of exceptions. Exceptions are the error and success return codes from the service request. These may be in the form of a return or update parameter and they show if the service request finished with a successful code or if some error was returned, due to the input parameters being incorrect or some other conditions not being met. Once an error return code has been identified, it is possible to search the code for where these error return codes are assigned. Exceptions can be found if a precondition violation check fails.

At step 808 service parameter type expansions are identified. Having collected all of the parameter types at step 804, it is now necessary to discover the types that these parameters refer to. The underlying definitions for the service parameter types will have been modelled as close to defined types as possible, in order that the implications of changes to them can be realised.

At step 809 an identification of module constraints is made. These are constraints on state variables and service parameters that hold for the module as a whole. For example, a constraint may consist of a constant that is referred to in a service and that is deemed to be of significance in determining the satisfaction of a precondition violation or the calculation of a post-condition.

Thus, after completing the step shown in FIG. 8, individual procedures will have been tagged, which are considered to be relevant in terms of the interface specification for the module. It is now possible to deduce actual state paths at step 704 from the tagged procedures identified at step 703.

Figure 9:
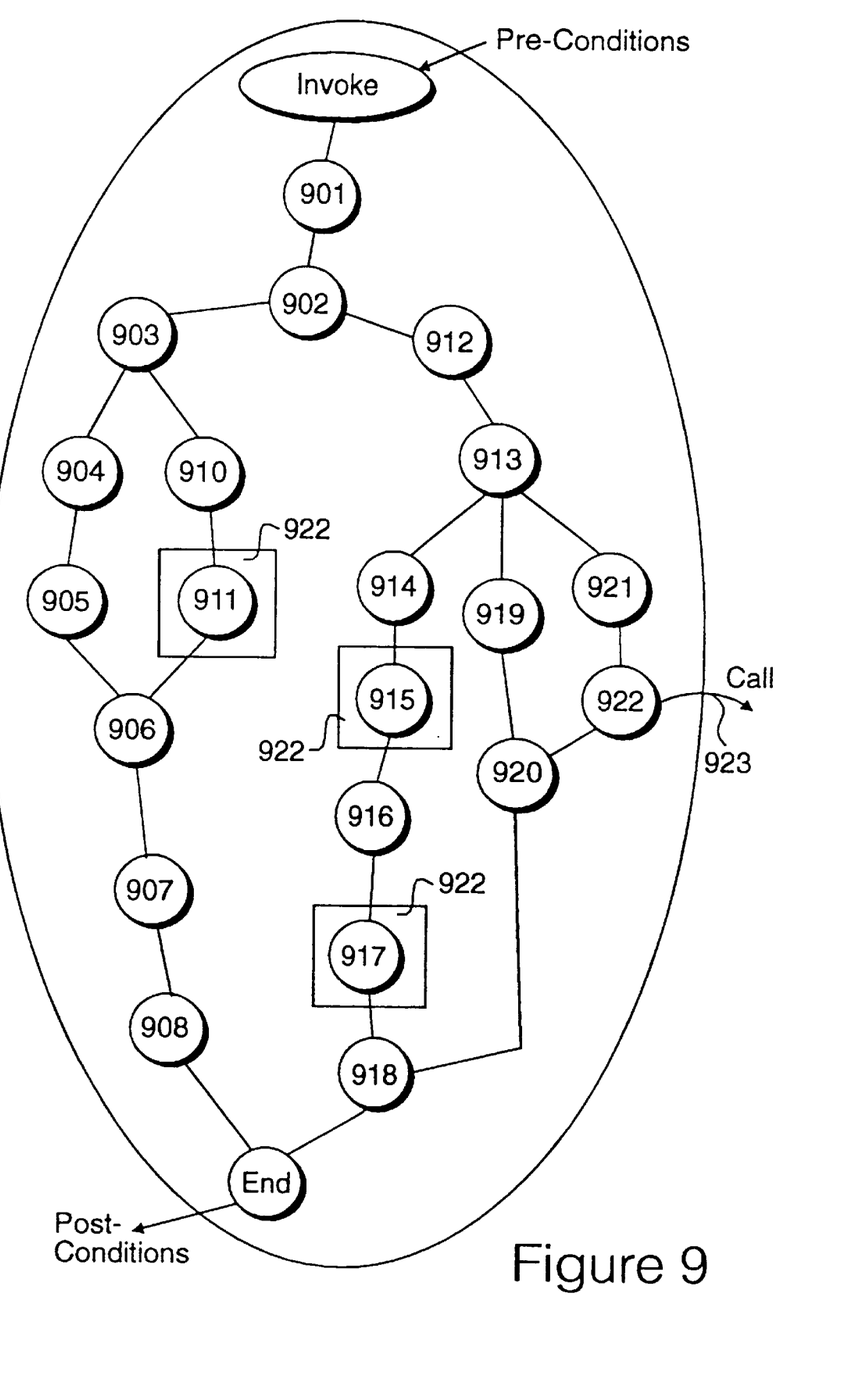
FIG. 9 shows an example of a module under analysis.

A diagrammatic representation of a particular instruction procedure, such as module 511 of module 506 shown in FIG. 5, is shown in FIG. 9. In order for the procedure to be invoked, certain pre-conditions must be satisfied and at the termination of the invocation certain post-conditions will have been set. As previously stated, it is essential for these pre-conditions and post-conditions to be known if the module is to be re-engineered and then successfully embedded within the executable instructions for the switch.

The procedures executed upon invocation of the procedure shown in FIG. 9 may be represented as a plurality of identifiable statements. Thus, after invocation, statement 901 is executed followed by the execution of statement 902. Statement 902 takes the form of a question, usually in the form of, IF a certain a condition is satisfied, control is directed to statement 903, ELSE control is directed to step 912.

Similarly, at statement 903 further branching occurs, such that, in response to specified conditions, control would be directed to statement 904 or statement 910. Similarly, after execution of statement 904., statement 905 is executed, with control then being directed to statement 906. As shown in FIG. 9, after the execution of statement 910, control is directed to statement 911, which again results in control being directed to statement 906. Thus, statements 904 and 905 represent a first branch with statements 910 and 911 representing an alternative branch, both of these branches being nested within the structure lying between statements 902 and 907.

After the execution of statement 907, control is directed to statement 908 and thereafter control is directed to the end condition, resulting in the final post-conditions being satisfied.

After implementing statement 902, control is directed to statement 913, consisting of a three-way branching point at which, subject to certain conditions being satisfied, will result in control being directed to statement 914, 919 or 921. After completion of statement 914, control is directed to statement 915, which in turn is followed by statement 916, followed by statement 917 and statement 918. Similarly, after control has been directed to procedure 919, control is directed to procedure 920, which terminates the level of nesting by redirecting control to procedure 918.

Alternatively, if control is directed to procedure 921, this is followed by procedure 922, followed by a return to procedure 920. Thus, procedure 920 represents a point at which a level of nesting is completed, the further level of nesting being completed by control being directed to procedure 918. Statement 922 is also capable of making a call to another procedure, say public procedure 510, in the module, as represented by arrow 923.

Thus, it can be seen that a plurality of paths are available in order to traverse from the invocation of the module to the termination of the module. In practice, the number of possible paths can be extremely large, in the order of millions. However, it is not necessary to consider all of these paths in order to specify interface information. The task involved in specifying interface information can be reduced significantly, if the interface related paths may be separated from those which do not affect the relationship between the pre-conditions and the post-conditions.

Referring to FIG. 7, at step 703, procedures relevant to interface information were identified and tagged. The tagging of such procedures is identified in FIG. 9 by the states being enclosed in a square tagging box 922. Thus, procedures 911, 915 and 917 are relevant in terms of. specifying the interfaces. Thus, in order to completely define the interface, it is only necessary to consider the paths which includes these tagged procedures. As far as the interface information is concerned, the other paths may be ignored, thereby significantly reducing the size of the task in hand. Typically, modules that include and define in the order of over two million paths may be reduced to a sub-set of less than one hundred paths which need to be considered for interface purposes.

At procedure 704 paths which include tagged procedures are identified so that, by looking at these paths in greater detail, the actual interface constraints may be defined at step 705.

Figure 10:
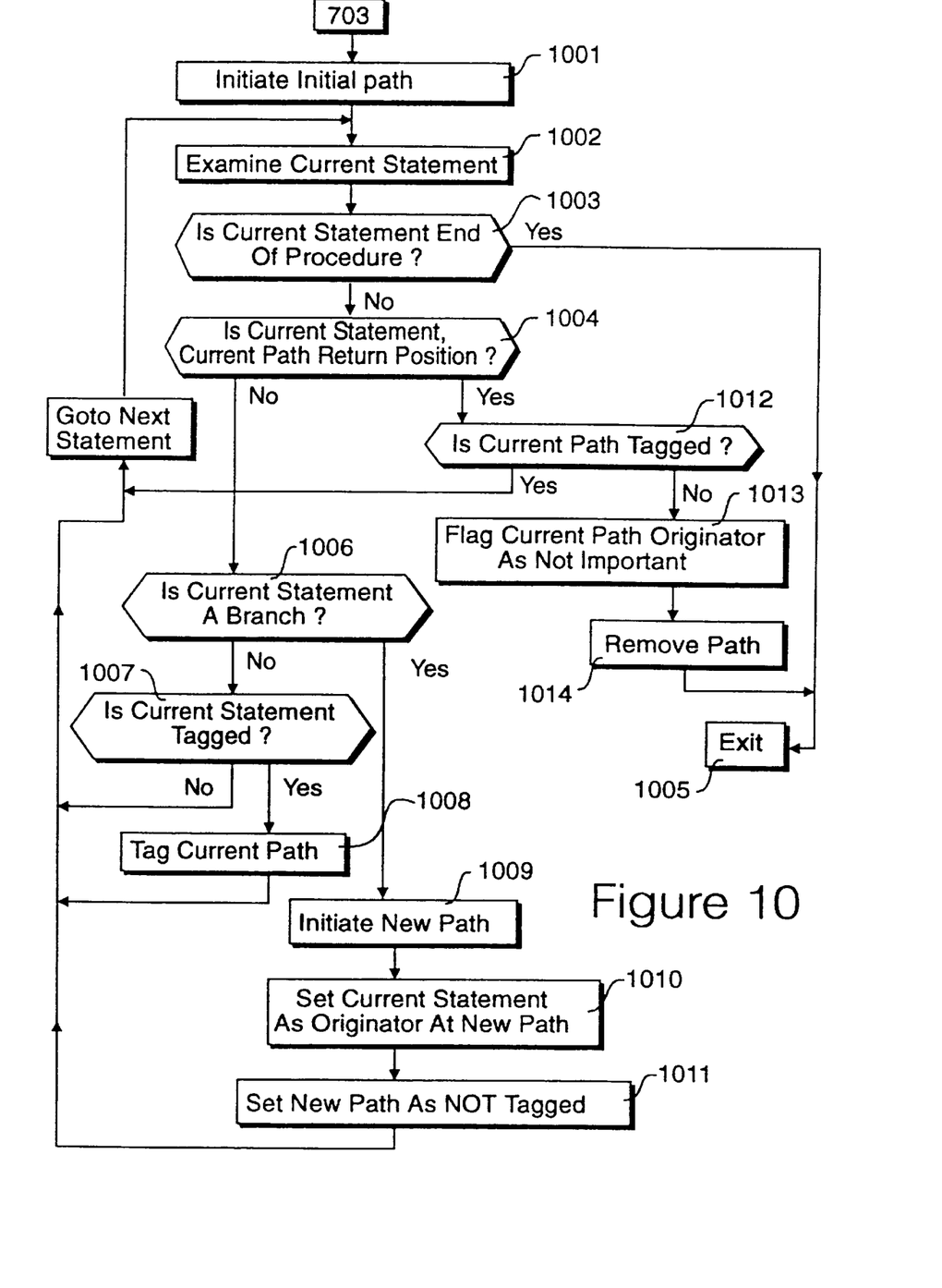
FIG. 10 details the tagging step of FIG. 3.
Figure 11:
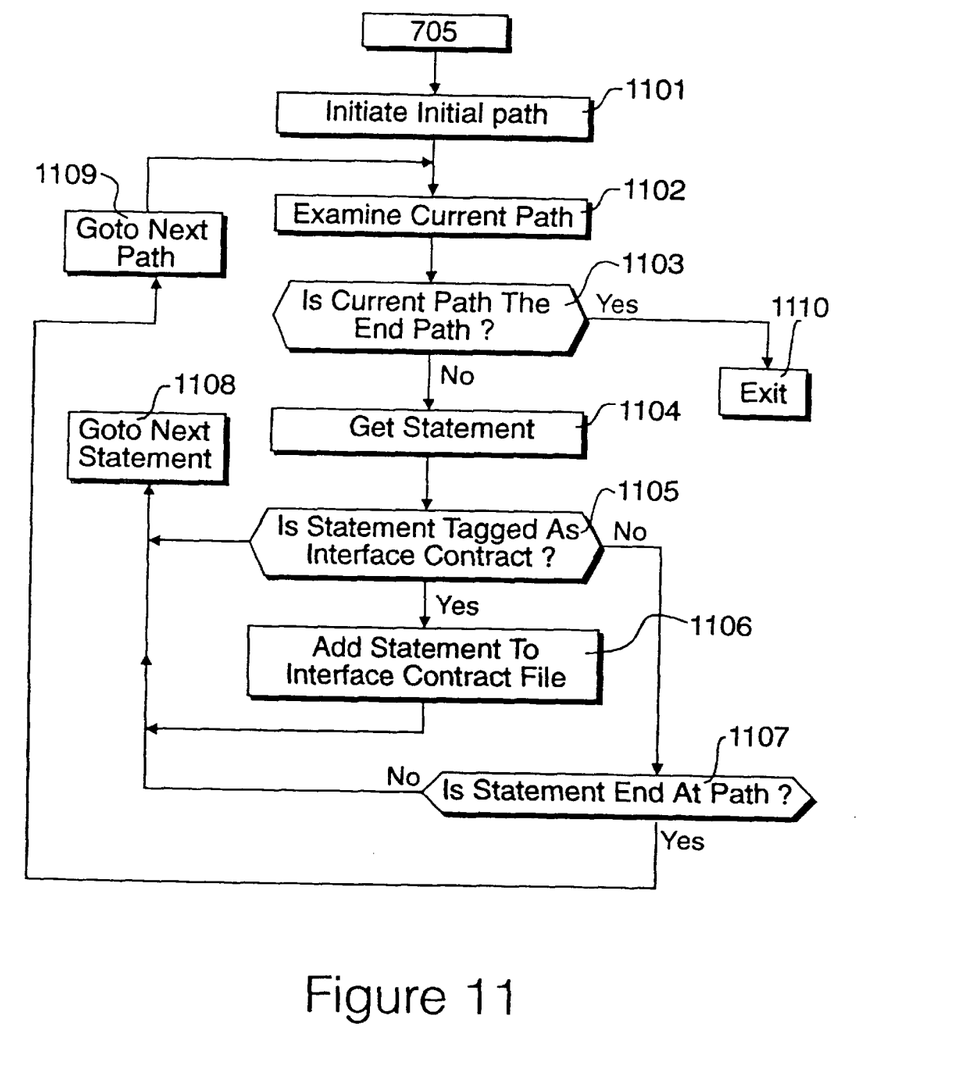
FIG. 11 details the deduction of paths step shown in FIG. 7.

The tagging of procedures is detailed in FIG. 10 and the deduction of paths which include tagged procedures is detailed in FIG. 11. Referring to FIG. 10, at step 1001 an initial path is initiated and at step 1002 the next statement identified in that path is examined. At step 1003 a question is asked as to whether the current statement is an end of procedure and if answered in the affirmative control is directed to step 1005, at which the routine terminates.

If the question asked at step 1003 is answered in the negative, to the effect that the current statement is not an end of procedure, a question is asked at step 1004 as to whether the current statement represents the return position for the current path. If answered in the negative, control is directed to step 1006, at which is asked as to whether the current statement is a branch. If answered in the negative, control is directed to step 1007 at which a question is asked as to whether the current statement has been tagged. If answered in the negative, the next statement is considered and control is returned to step 1002.

If a question asked at step 1007 is answered in the affirmative, to the effect that the current statement has been tagged, the path as a whole is tagged at step 1008 and control is then returned to step 1002.

If the question asked at step 1006 is answered in the affirmative, to the effect that the current statement is a branch, a new path is initiated at step 1009 and at step 1010 a current statement is set to the effect that it originates a new path. At step 1011 a new path, defined at step 1010, is provisionally set as not being tagged and control is then returned to step 1002.

If a level of nesting has been identified, by the question asked at step 1006 being answered in the affirmative, the question asked at step 1004 will also, eventually, be answered in the affirmative, given that the path must return when a statement is identified at step 1004 as the current path return position. Thus, when the question asked at step 1004 is answered in the affirmative a question is asked at step 1012 as to whether that current path has been tagged. If this question is answered in the affirmative, control is returned to step 1002.

If a question asked at step 1012 is answered in the negative, the current path originator is flagged as not being important at step 1013 and at step 1014 the path is removed and the routine exits at step 1005.

At step 705 of FIG. 7 for defining interface constraints for deduced paths which include tagged steps, is detailed in FIG. 12. An initial path is identified at step 1101 and examined at step 1102. A question is asked at step 1103 as to whether the current path is the end path and if answered in the affirmative control exits at 1110.

If a question asked at step 1103 is answered in the negative, a statement is examined at step 1104 and at step 1105 a question is asked as to whether the statement has been tagged as relating to the interface. If this question is answered in the affirmative, control is directed to step 1106 at which the statement is added to a file defining the interface. Thereafter, control is returned to step 1104 and the next statement is examined.

If the statement identified at step 1104 has not been tagged, the question asked at step 1105 is answered in the negative and control is directed to step 1107. At step 1107 a question is asked as to whether the statement is an end of path. If answered in the negative control is returned to step 1104 and the next statement of that path is considered. Alternatively, if the question asked at step 1007 is answered in the affirmative, control is returned to step 1102 and the next path is considered.

We claim:

1. Apparatus for analysing a selected module from a plurality of modules of originating instructions so as to generate upgraded originating instructions, the upgraded originating instructions being for conversion into corresponding upgraded control instructions to control operations of a telecommunications switch, the apparatus comprising analysing means for analysing the function specified by the selected module so as to generate an interface specification;

generating means for generating the upgraded originating instructions on the basis of the interface specification;

converting means for converting said upgraded originating instructions to produce said control instructions; and downloading means for downloading said upgraded control instructions on to said telecommunications switch, wherein said analysing means comprises selecting means for selecting a bounded module having a plurality of statements, executable by said switch after conversion, of which some are arranged to communicate across said boundary;

labelling means for labelling statements in said module arranged to control communication across said boundary, which thereby represent the interface characteristics of said boundary, said labelling means incorporating means for labelling internal variables relevant to said interface information; and processing means for processing said labelled statements to produce said interface specification.

2. Apparatus according to claim 1, wherein statements within the selected module are grouped together to define a plurality of procedures and interface statements are processed sequentially for each of said procedures.

3. Apparatus according to claim 1, wherein said labelling means includes means for labelling external variables relevant to said interface information.

4. Apparatus according to claim 1, wherein said labelling means includes means for identifying pre-conditions relevant to said interface information.

5. Apparatus according to claim 1, wherein said labelling means includes means for identifying post-conditions relevant to said interface information.

6. Apparatus according to claim 1, wherein said processing means examines paths through said statements, and retains paths which include statements labelled by said labelling means.

7. A method of analysing a selected module from a plurality of modules of originating instructions so as to generate upgraded originating instructions, the upgraded originating instructions being for conversion into corresponding upgraded control instructions to control operations of a telecommunications switch, the method comprising the steps of;

analysing the function specified by the selected module so as to generate an interface specification;

generating the upgraded originating instructions on the basis of the interface specification;

converting said upgraded originating instructions to produce said control instructions; and downloading said upgraded control instructions on to said telecommunications switch, wherein said analysing step comprises selecting a bounded module having a plurality of statements, executable by said switch after conversion, of which some are arranged to communicate across said boundary;

labelling statements in said module arranged to control communication across said boundary, which thereby represent the interface characteristics of said boundary, said labelling means incorporating means for labelling internal variables relevant to said interface information; and processing said labelled statements to produce said interface specification.

8. A method according to claim 7, wherein statements within a selected module are grouped together to define a plurality of procedures; and interface statements are processed sequentially for each of said procedures.

9. A method according to claim 7, wherein said step of labelling statements which communicate across said boundary includes labelling external variables relevant to said interface information.

10. A method according to claim 7, wherein said step of labelling statements which communicate across said boundary includes identifying pre-conditions relevant to said interface information.

11. A method according to claim 7, wherein said step of labelling statements which communicate across said boundary includes labelling post-conditions relevant to said interface information.

12. A method according to claim 7, wherein said step of processing said statements includes examining paths through said statements, and retaining paths which include said labelled statements.

* * * * *